United States Patent [19]

Grossmeyer

[11] Patent Number: 4,738,477
[45] Date of Patent: Apr. 19, 1988

[54] DISPOSABLE APPARATUS FOR THE COLLECTION OF REFUSE

[76] Inventor: Mark C. Grossmeyer, N49 W6757 Western Rd., Cedarburg, Wis. 53012

[21] Appl. No.: 909,591

[22] Filed: Sep. 22, 1986

[51] Int. Cl.$^4$ .......................... B65D 63/00; B65F 1/14
[52] U.S. Cl. ...................... 294/1.1; 15/257.1; 56/329; 150/52 R; 150/55
[58] Field of Search .............. 294/1.1, 1.3, 137, 152; 15/104.8, 257.1–257.9; 53/390; 56/329; 141/390, 391; 150/48, 49, 52 R, 55; 206/223, 496; 383/4

[56] References Cited

U.S. PATENT DOCUMENTS

| | | | |
|---|---|---|---|
| 219,080 | 9/1879 | Edwards | 56/329 X |
| 732,838 | 7/1903 | Edwards | 150/55 |
| 2,630,663 | 3/1953 | Hopingarner | 15/257.1 |
| 2,749,957 | 6/1956 | Smith | 150/52 R X |
| 2,766,797 | 10/1956 | Cowen | 383/4 X |
| 3,490,216 | 1/1970 | Gonzales | 56/329 |
| 3,623,526 | 11/1971 | Robertson | 150/52 R |
| 3,757,990 | 9/1973 | Buth | 206/223 X |
| 4,366,949 | 1/1983 | Staub | 150/52 R X |
| 4,466,516 | 8/1984 | Sicoli et al. | 383/4 X |
| 4,519,183 | 5/1985 | Parody | 294/1.1 X |

Primary Examiner—Johnny D. Cherry
Attorney, Agent, or Firm—Andrus, Sceales, Starke & Sawall

[57] ABSTRACT

A disposable apparatus for the collection of refuse includes a sheetlike member for placement upon a surface. The member is devoid of apertures, defines a regular geometric shape, and in some embodiments includes a plurality of disposable securing stakes or adhesive pads attached at corners thereof for affixing the member to the surface during the collection of refuse. The corners are securable to one another by tying for disposal of the member, the securing stakes or adhesive pads, and the refuse collected thereon. Several preferred embodiments are disclosed.

13 Claims, 1 Drawing Sheet

DISPOSABLE APPARATUS FOR THE COLLECTION OF REFUSE

This invention relates generally to apparatus used for the collection and disposition of refuse and more particularly, to a disposable apparatus constructed to be readily attachable to the surface of the earth as may be desirable for the collection of leaves and grass clippings or to the surface of a floor for the collection of industrial sweepings and the like.

One type of apparatus used for the gathering of refuse is shown and described in U.S. Pat. No. 2,766,797 and includes a reuseable canvas or fabric sheet having apertures formed at the corners, at the center, and at locations intermediate the center and the corners. When refuse is collected, the corners are tied together using an included string and the device and its contents are carried to a disposal site. Thereupon, the string is untied and the user inverts the bag to grasp a central cord which is then lifted upward, thereby depositing the refuse and retrieving the reuseable device.

Another approach to the problem of outdoor refuse collection is shown and described in U.S. Pat. No. 4,366,949 and includes a flexible netting which generally defines a rectangle and is arranged to have one portion thereof vertically supported upon stakes to form a backstop as leaves are blown thereupon by wind. Following collection including any necessary final raking, the netting is released from its stakes, its corners gathered to a common point, the corners are joined together with twine, the refuse carried and deposited to a suitable site, and the netting is preferably reused.

While these devices have heretofore been generally satisfactory for the collection of refuse, they have failed to appreciate the manner in which a disposable apparatus may be constructed to include self-adhering securing means to be useful either upon earth or floorlike surfaces.

SUMMARY OF THE INVENTION

In general, a disposable apparatus for the collection of refuse includes a sheetlike member for placement upon a surface. The member defines a regular geometric shape, and includes a plurality of disposable securing means attached at corners thereof for affixing the member to the surface during the collection of refuse. The corners are joined to one another by tying for carrying and disposal of the member, the securing means, and the refuse collected thereon. Several preferred embodiments are disclosed.

It is an object of the invention to provide an easily-useable and disposable apparatus for the collection of refuse.

Yet another object of the invention is to provide a disposable collection apparatus which may include a plurality of disposable securing means for attaching the apparatus to the earth or to a floorlike-surface while refuse is being collected. How these and other objects are accomplished will become more apparent from the following detailed description thereof taken in conjunction with the drawing.

DESCRIPTION OF THE PREFERRED EMBODIMENTS

Figure 1:
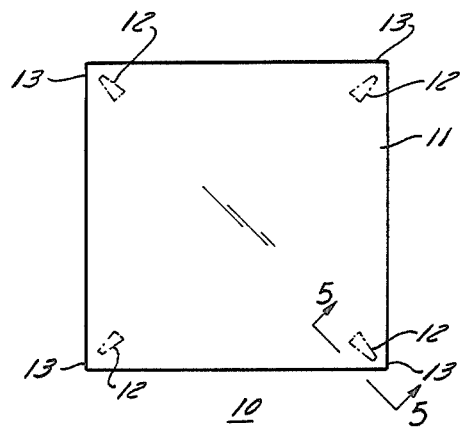
FIG. 1 is a top plan view of a first embodiment of the invention with the securing means shown in phantom.

Referring to FIG. 1, a disposable apparatus 10 for the collection of refuse includes a sheetlike member 11 for placement upon a surface. The member 11 defines a regular geometric shape, and includes a plurality of disposable securing means 12 attached at corners 13 thereof for affixing the member 11 to the surface during collection of refuse. Affixation in that manner aids in the retention of a generally planar orientation of the member 11 which would otherwise be disturbed by wind or by the collection process itself. After refuse collection, the corners 13 and their securing means 12 are detachable from the underlying surface and joinable to one another by drawing the corners upward and tying them, preferably to themselves or by a separate cord, string, or other means. Thereafter, the member 11, the securing means 12, and the refuse may be disposed of. It is to be appreciated that if diagonal corners 13 are tied to one another or if all corners 13 are tied together, a small space will exist beneath the knot(s) for carrying the member 11 and its contents suitcase fashion, an ergonometrically desirable and comfortable carrying mode. It is also to be appreciated that, unlike conventional refuse bags, the apparatus 10 is manageable by one person from initial placement through disposal and with no additional implements being required.

Figure 3:
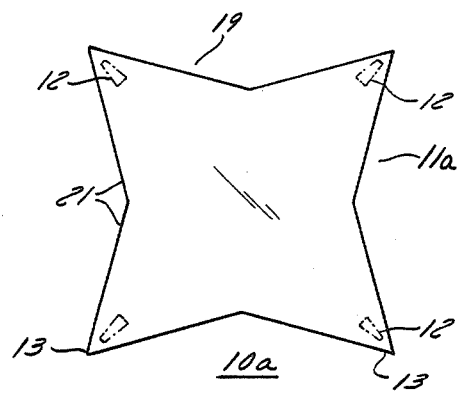
FIG. 3 is a top plan view of a second embodiment of the invention with the securing means shown in phantom.
Figure 2:
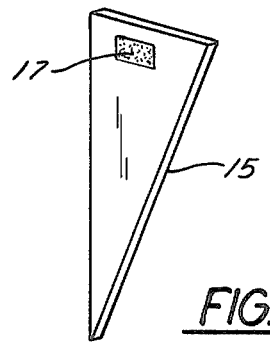
FIG. 2 is an isometric view of a securing stake useful with embodiments of the invention.
Figure 5:
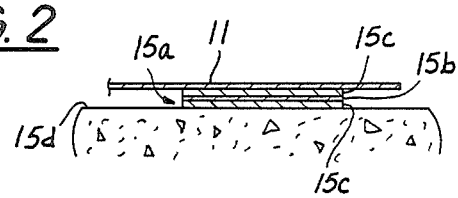
FIG. 5 is a sectional view taken generally along line 5—5 of FIG. 1, showing the adhesive pad embodiment of the securing means of the present invention.

If the apparatus 10 is to be used outdoors upon an earth surface, a preferred securing means 12 is embodied as a stake 15 which is illustrated in FIG. 2 and which may be formed of plastic or other suitably rigid material and has a portion 17 coated with an adhesive for attachment at the corners 13 of the member 11, either at the time of manufacture or just prior to use. The stakes 15 may also be bonded to the member 11 by the application of heat or may be separately packaged or supplied with the member 11 and forcibly inserted therethrough at the corners 11. In the alternative, the securing means 12 may be embodied as a readily-available double-sided adhesive pad 15a if the apparatus 10 is to be used upon a floorlike surface, as shown in FIG. 5. As is well known, adhesive pad 15a includes a web 15b having an adhesive layer 15c disposed on either side thereof. Adhesive layers 15c secure web 15b to sheet like member 11 and to a floorlike surface, shown at 15d. A variation of the aforedescribed arrangement includes a fifth securing means 12 disposed along that edge of the member 11 over which refuse is intended to be raked or swept. The securing means 12 would preferably be disposed midway between the adjacent corners 13 and would aid in preventing lifting of that edge. The edges of the sheetlike member 11 may define a rectangle as shown in FIG. 1 or, as shown in the apparatus 10a of FIG. 3, a sheet like member 11a may define four edges 19, each edge 19 having a pair of straight, intersecting segments 21 defining an obtuse angle therebetween. An advantage of including the securing means 12 as attachments to the member 11 or 11a is that the securing means 12 are less likely to become lost prior to use, need not be further located within the packaging, otherwise separately handled and less likely to be inadvertently left in the earth or on the floor, as the case may be. Additionally, the presence of the securing means 12 aids in preventing knot unraveling after corners 13 are tied and no separate string or cord is required for tying. The embodiment of FIG. 3 would require less material and may lend itself to easier tying of the corners 13. The embodiments of FIGS. 1 and 3 may also be used for bundling small sticks or twigs by placing them upon the member 11 or 11a along an axis generally midway between a pair of opposed edges. The user may then grasp those opposed edges to wrap or surround the bundle, tying the then-adjacent corners to one another and lifting the member 11 or 11a by its then-knotted corners for disposal.

Figure 4:
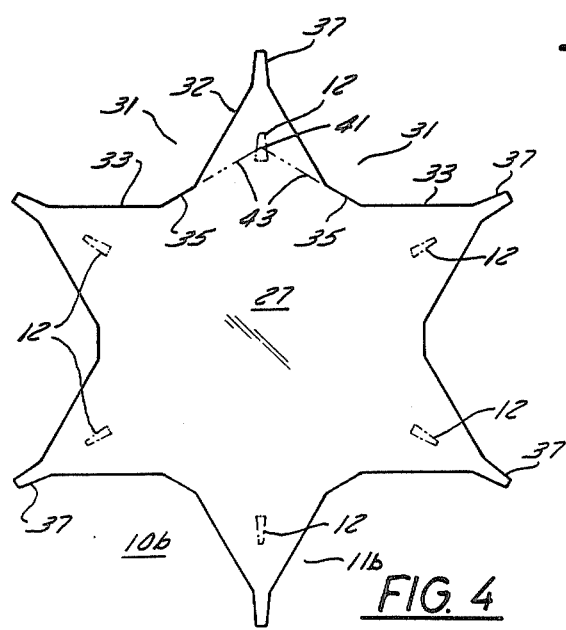
FIG. 4 is a top plan view of a third embodiment of the invention.

Referring to FIG. 4, another embodiment of the apparatus 10b is shown to include a sheetlike member 11b which has a plurality of generally scalloped edges 31 surrounding the central collection portion 27. Each of the edges 31 includes a pair of distal segments 33 and a proximal segment 35 intermediate the distal segments 33. A tying tab 37 is formed at the ends of the distal segments 33 of adjacent edges 31, the tabs 37 being securable to the surface during the collection of refuse and securable to one another by tying for simultaneous disposal of the member 11b and the refuse.

One way to secure the member of FIG. 4 to the surface is by a plurality of securing means 12, each adhering to the underside of the tabs 37 and outside of the region of the central collection portion 27. A preferred location for each of the securing means 12 will be at a point 41 generally coinciding with the intersection of the projections 43 of adjacent proximal segments 35. When used outdoors on an earth surface, the securing means 12 is preferably in the form of stakes, as shown at 15 (FIG. 2). In the alternative, adhesive pads 5a, (FIG. 5) may be used for attachment of the member 11b to a floorlike surface.

While securing means 12 embodied as self-adhering, disposable stakes 15 or adhering pads 15a have been described for the embodiments, it is also possible to provide members 11, 11a and 11b with a separate loop of cord or twine (not shown) at each corner thereof for receiving a stake therethrough. However, the manufacture of such embodiments would likely result in a cost significantly higher than those of the described embodiments. In all embodiments, suitable members 11, 11a and 11b may be formed using a plastic sheet on the order of 2 mils in thickness and other materials or thicknesses may be used depending upon overall size of the members 11, 11a and 11b, availability of materials and the like. Materials are preferably selected in view of their cost, imperviousness to water if wet refuse is to be collected, strength, and the planar area of the apparatus 10–10b to be constructed.

While only a few preferred embodiments have been shown and described herein, the invention is not intended to be limited thereby but only by the scope of the claims which follow.

I claim:

1. A disposable apparatus for the collection of refuse and including:
   a sheetlike member for placement upon a surface, said member defining a regular geometric shape having a plurality of corners, and including a plurality of disposable securing means bonded to said sheetlike member adjacent said corners thereof and disposed interiorly of the perimeter of said sheetlike member, said securing means being adapted for affixing said member to said surface during the collection of refuse;
   said corners being adapted to be tied together after collection of refuse on said sheetlike member for forming a bundle and providing simultaneous disposal of said sheetlike member, said securing means, and said refuse collected thereon by disposal of said bundle.

2. The invention set forth in claim 1 wherein the perimeter of said sheetlike member is defined by four edges, each edge having a pair of straight, intersecting segments defining an obtuse angle therebetween.

3. The invention set forth in claim 1 wherein said sheetlike member is rectangular and is formed of plastic, and wherein said securing means includes a disposable stake bonded to said sheetlike member adjacent each corner of said sheetlike member.

4. The invention as set forth in claim 3 wherein each said disposable stake is bonded to said sheetlike member by being adhesively attached thereto.

5. The invention set forth in claim 1 wherein said securing means includes a plurality of pads adhesively connected to said sheetlike member and disposed adjacent each corner thereof, said pads being provided with an adhesive on one side for securing said pad to said sheetlike member and being provided on the other side with an adhesive for securing said pad to said surface.

6. The invention set forth in claim 1 wherein said plurality of disposable securing means are bonded to said sheetlike member by being adhesively attached thereto.

7. A disposable apparatus for the collection of refuse and including:
   a sheetlike member for placement upon a surface;
   said sheetlike member defining a regular geometric shape and including a plurality of corners and a central collection portion;
   said corners each including a pad adhesively connected to said sheetlike member and disposed adjacent each said corner thereof, said pads being provided with an adhesive on one side for securing said pads to said sheetlike member and being provided with an adhesive on the other side for affixing said sheetlike member to said surface during the collection of refuse;
   said corners of said sheetlike member being adapted to be tied together after collection of refuse on said sheetlike member for forming a bundle and providing simultaneous disposal of said sheetlike member and said refuse collected thereon by disposal of said bundle.

8. The invention set forth in claim 7 wherein said geometric shape is a rectangle.

9. A disposable apparatus for the collection of refuse and including:
   a sheetlike member for placement upon a surface during the collection of refuse;
   said member having a central collection portion and a plurality of radially spaced projecting portions extending from said central collection portion to thereby form a plurality of generally concave edge portions between said radially spaced projecting portions;
   said member further including a typing tab formed at the distal ends of said radially extending portions, said tabs being securable to said surface during said collection of refuse, said tabs adapted to be tied to one another after refuse has been collected on said central collection portion of said sheetlike member for forming a bundle and providing simultaneous disposal of said sheetlike member together with said refuse by disposal of said bundle.

10. The invention set forth in claim 9 wherein said member is securable to said surface by a plurality of stakes bonded to said sheetlike member adjacent each said tying tab.

11. The invention set forth in claim 9 wherein said member is securable to said surface by a plurality of pads adhesively connected to said sheetlike member and disposed within the radially spaced projecting portions extending from said central collection portion, said pads being provided with an adhesive on one side for securing said pad to said sheetlike member and being provided on the other side with an adhesive for securing said pad to said surface.

12. A disposable apparatus for the collection of refuse and including:
 a sheetlike member for placement upon an earthen surface, said member defining a regular geometric shape and including a plurality of corner portions and a central collection portion;
 a plurality of disposable stakes bondable to said sheetlike member adjacent each corner of said sheetlike member and adapted to be disposed interiorly of the perimeter of said sheetlike member for securement of said member to said earthen surface;
 said corner portions being adapted to be tied together after collection of refuse on said sheetlike member for forming a bundle and providing simultaneous disposal of said sheetlike member, said stakes, and said refuse collected thereon by disposal of said bundle.

13. The invention as set forth in claim 12 wherein said plurality of disposable stakes are bondable to said sheetlike member by being adhesively connectable thereto.

* * * * *